(12) United States Patent
Uchida et al.

(10) Patent No.: US 6,821,005 B2
(45) Date of Patent: Nov. 23, 2004

(54) VEHICLE HEADLAMP

(75) Inventors: Hideki Uchida, Shizuoka (JP); Makoto Izawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/282,456

(22) Filed: Oct. 29, 2002

(65) Prior Publication Data

US 2003/0090905 A1 May 15, 2003

(30) Foreign Application Priority Data

Oct. 30, 2001  (JP) ..................................... P. 2001-331823

(51) Int. Cl.⁷ ............................. B60Q 1/06; B60Q 1/08; B60Q 1/10
(52) U.S. Cl. ........................ 362/466; 362/467; 362/544; 362/526
(58) Field of Search .............................. 362/465, 459, 362/466, 543, 544, 467, 526, 514, 515; 315/82

(56) References Cited

U.S. PATENT DOCUMENTS

| | | | | |
|---|---|---|---|---|
| 3,814,984 A | * | 6/1974 | Morita et al. ................. | 315/83 |
| 6,152,584 A | * | 11/2000 | Tsukamoto .................. | 362/465 |
| 6,305,823 B1 | * | 10/2001 | Toda et al. .................. | 362/276 |
| 6,332,698 B1 | | 12/2001 | Toda et al. | |
| 6,422,726 B1 | * | 7/2002 | Tatsukawa et al. ......... | 362/517 |

FOREIGN PATENT DOCUMENTS

| | | |
|---|---|---|
| GB | 2332742 A | 6/1999 |
| JP | 2000-85458 | 3/2000 |

* cited by examiner

*Primary Examiner*—Stephen Husar
*Assistant Examiner*—Sharon Payne
(74) *Attorney, Agent, or Firm*—Fish & Richardson P.C.

(57) ABSTRACT

In a headlamp comprising low beam irradiating, there are provided main beam irradiating means, light distribution switching means for switching a low beam and a main beam, abnormality detecting means for detecting an abnormal situation in which a proper low beam cannot be formed, and optical axis tilting means for vertically tilting an optical axis of at least a main beam, and the abnormality detecting means detects an abnormality, a light distribution is switched into a main beam by the light distribution switching and the optical axis of the main beam is turned downward by the optical axis tilting means. When a proper low beam cannot be formed, a main beam having a larger light amount is generally turned on to maintain a visibility in of a vehicle and the optical axis of the main beam is turned downward such that glare light is not generated.

2 Claims, 7 Drawing Sheets

VEHICLE HEADLAMP

BACKGROUND OF THE INVENTION

1. Field of the Invention

The present invention relates to a headlamp for a vehicle comprising low beam irradiating means, main beam irradiating means and light distribution switching means for switching a low beam and a main beam.

2. Description of the Related Art

A conventional headlamp for a vehicle comprises low beam irradiating means for emitting light forward, obliquely and downward from a vehicle and illuminating a region at a short distance, thereby forming a low beam which does not become glare light for a vehicle running in the opposite direction, and main beam irradiating means for emitting light in almost parallel with an axle and illuminating a region at a long distance, thereby forming a main beam which is convenient for driving in the case in which the vehicle does not run in the opposite direction, and is constituted such that the low beam and the main beam are switched by light distribution switching means to obtain a light distribution corresponding to a driving situation.

In the conventional headlamp, however, some abnormality might be generated, for example, a light source bulb for a low beam can not be turned on due to a wiring disconnection being happening during a drive with the low beam light. Furthermore, in another case, switching from a main beam to a low beam cannot be carried out with the main beam being held as it is even though switching is actually executed. In the case where such abnormality is generated, the main or high beam shall be kept to be turned on in driving. However, glare light given to a vehicle, which is driving in the opposite direction, is not preferable in respect of safety.

There is a solution for such a problem using a technique for attenuating a main beam so as not to generate a glare light. However, the amount of light of the main beam is consequently decreased so that a visibility becomes reduced. Therefore, the technique is eventually not safe in respect of driving condition.

SUMMARY OF THE INVENTION

Taking these problems into consideration, it is an object of the invention to provide a headlamp for a vehicle capable of maintaining a visibility in a forward direction of a vehicle and forming a proper light distribution which does not produce a glare light for a vehicle driving in the opposite direction by turning on the main beam (or switching a light distribution by a low beam to that of the main beam) when some abnormality is generated over a light distribution for the low beam.

In order to achieve the object, a first aspect of the invention is directed to a headlamp for a vehicle comprising low beam irradiating means, main beam irradiating means, light distribution switching means for switching a low beam and a main beam, abnormality detecting means for detecting an abnormal situation in which a proper low beam cannot be formed, and optical axis tilting means for vertically tilting an optical axis of at least a main beam, wherein in the case wehere the abnormality detecting means detects the abnormal situation, the light distribution switching means can be driven if necessary and the optical axis tilting means can be driven to turn the optical axis of the main beam downward, said main beam being turned on or energized.

For the optical axis tilting means, a tilting mechanism for vertically tilting the optical axis of the lamp can be proposed. In the case in which serious troubles in which a proper low beam cannot be formed are made by the abnormality detecting means, a driver recognizes the serious troubles through the abnormality display means such as a warning light. There are the cases in which a light distribution is manually switched into the main beam if necessary and the optical axis tilting mechanism is driven to turn the main beam downward and the case in which the light distribution switching means is automatically driven and the optical axis tilting mechanism is automatically driven if necessary in connection with the abnormality detection of the abnormality detecting means.

According to a second aspect of the invention, in the case in which a low beam is turned on in a headlamp extinction state or an abnormal situation is detected during lighting of the low beam, a light distribution is switched into a main beam by the light distribution switching means and an optical axis of the main beam is turned downward by the optical axis tilting means, and in the case in which an abnormal situation is detected when the light distribution is to be switched from the main beam to the low beam, the light distribution is maintained as it is or the light distribution is returned to the main beam by the light distribution switching means, and the light distribution or the optical axis of the light distribution of the main beam is turned downward.

More specifically, a first case in which the low beam is turned on when the headlamp is put out, a second case in which the low beam is being turned on, and a third case in which a light distribution is switched from the main beam to the low beam can be proposed for a period in which the serious troubles are detected. In the first case, the low beam is not turned on at all. In the second case, the low beam is turned off during lighting. In both cases, when these situations are detected by the abnormality detecting means, the light distribution can be switched into the main beam by the light distribution switching means and the optical axis of the main beam can be turned downward by the optical axis tilting means.

Moreover, the third case includes the case in which lighting is not vehicleried out when the light distribution is switched from the main beam to the low beam by the light distribution switching means (first and second embodiments) and the case in which the light distribution switching means cannot be driven as is expected (third, fourth and fifth embodiments). When these situations are detected by the abnormality detecting means, the light distribution is returned to the main beam by the light distribution switching means or the optical axis of the main beam is turned downward by the optical axis tilting means with the light distribution maintained. (Function) For example, in the case in which some abnormality is generated so that a proper low beam cannot be formed, that is, a light source bulb for a low beam cannot be turned on due to a disconnection during driving with the low beam turned on or the light distribution cannot be switched (the main beam is maintained) although the switching from the main beam to the low beam is vehicleried out by the light distribution switching means, the light distribution is set to be the main beam in principle. Since the main beam generally has a larger light amount than that of the low beam, a visibility in the forward direction of a vehicle can be maintained. Moreover, the main beam is light which is almost parallel with an axle and can become glare light for a vehicle driving in the opposite direction. By turning the optical axis of the main beam downward, however, a countermeasure can be taken to prevent the glare light from being generated.

A third aspect of the invention is directed to the headlamp for a vehicle according to the first or second aspect of the invention, wherein the low beam irradiating means is constituted by a reflector for a low beam and a light source for a low beam, and the main beam irradiating means is constituted by a reflector for a main beam and a light source for a main beam, and the light distribution switching means is constituted by a circuit for switching power supply to each of the light sources of the two beam irradiating means.

(Function) The low beam irradiating means and the main beam irradiating means are constituted by the separate reflector and light source, respectively. Therefore, large light amounts can be maintained respectively, and furthermore, both reflectors can easily be provided adjacently and can also have simple structures. Since the light distribution switching means is constituted by the circuit for switching the power supply to the respective light sources and a mechanical driving section is not provided, moreover, it is small-sized and has a light weight, and rarely causes failures.

A fourth aspect of the invention is directed to the headlamp for a vehicle according to the third aspect of the invention, wherein the reflector for a low beam and the reflector for a main beam are constituted by a single reflector having a reflecting surface for a low beam and a reflecting surface for a main beam, and the light source for a low beam and the light source for a main beam are constituted by a single light source bulb having a pair of built-in filaments (a front filament for a low beam, a shade for light distribution control for shielding a part of the light emission of the filament, and a rear filament for a main beam) which are provided apart from each other in an axial direction.

(Function) The low beam irradiating means and the main beam irradiating means are constituted by the single light source inserted and attached into the single reflector. Therefore, the size of the whole headlamp can be reduced correspondingly.

A fifth aspect of the invention is directed to the headlamp for a vehicle according to the first or second aspect of the invention, wherein the low beam irradiating means and the main beam irradiating means are constituted with a single reflector, a single light source and a single shade for light distribution control integrated with each other, and the light distribution switching means is constituted such that any of the reflector, the light source and the shade for light distribution control is driven to switch a light distribution. A discharge bulb capable of obtaining a larger light amount than that of an incandescent bulb is desirable for the single light source to be inserted and attached into the single reflector.

(Function) The single reflector, the single light source and the single shade for light distribution control are integrated to constitute the low beam irradiating means and the main beam irradiating means. Consequently, the size of the whole headlamp can be reduced correspondingly.

When a part of the reflector is tilted longitudinally with respect to the light source and the shade, the optical axis of the reflector (the optical axis of reflected light on the reflector) is changed vertically. When the light source is tilted vertically with respect to the reflector and the shade, the optical axis of the reflector (the optical axis of the reflected light on the reflector) is changed vertically. When the shade for light distribution control is moved longitudinally with respect to the reflector and the light source, the effective reflecting surface region of the reflector is changed so that the optical axis of the reflected light is changed vertically.

A sixth aspect of the invention is directed to the headlamp for a vehicle according to any of the first to fifth aspects of the invention, wherein the headlamp comprises an auto-leveling device for carrying out a vertical tilt and regulation such that the optical axis of the lamp has a constant configuration with respect to a road based on a detection value of a vehicle sensor, an optical axis tilting mechanism of the auto-leveling device and a control section for controlling a driving operation thereof constituting the optical axis tilting means.

(Function) In the headlamp comprising the auto-leveling device for carrying out a tilt and regulation such that the optical axis of the lamp has a constant configuration with respect to a driving road, (the optical axis tilting mechanism and the control section for controlling a driving operation thereof) of the auto-leveling device is used as the optical axis tilting means for vertically tilting the optical axis of the main beam. Consequently, the optical axis tilting means of the main beam does not need to be provided separately.

DESCRIPTION OF THE PREFERRED EMBODIMENTS

Next, the invention will be described based on embodiments.

Figure 1:
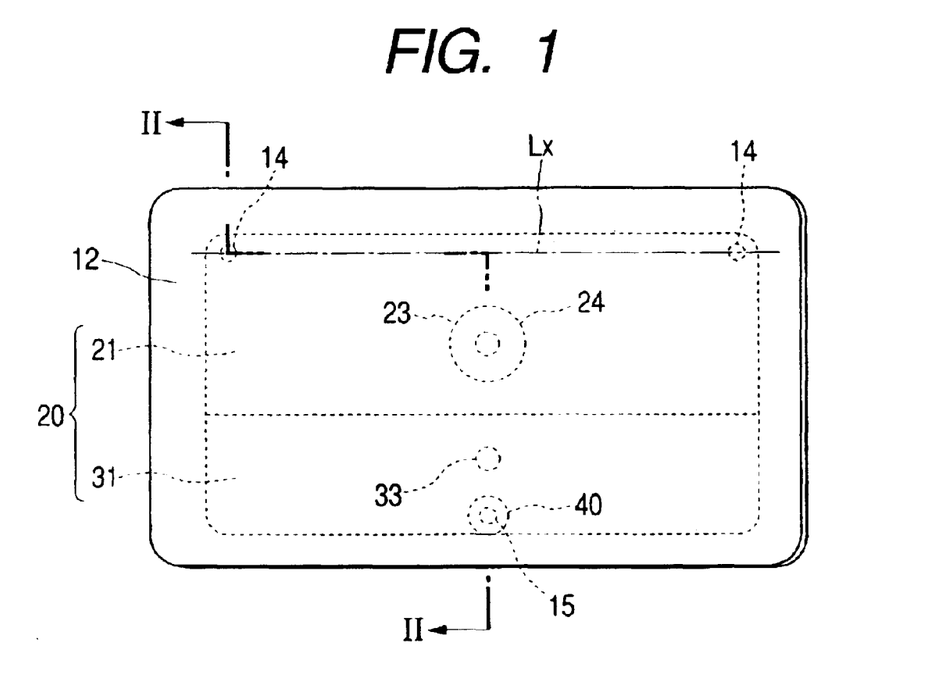
FIG. 1 is a front view showing a four-light type headlamp for a vehicle according to a first embodiment of the invention.
Figure 2:
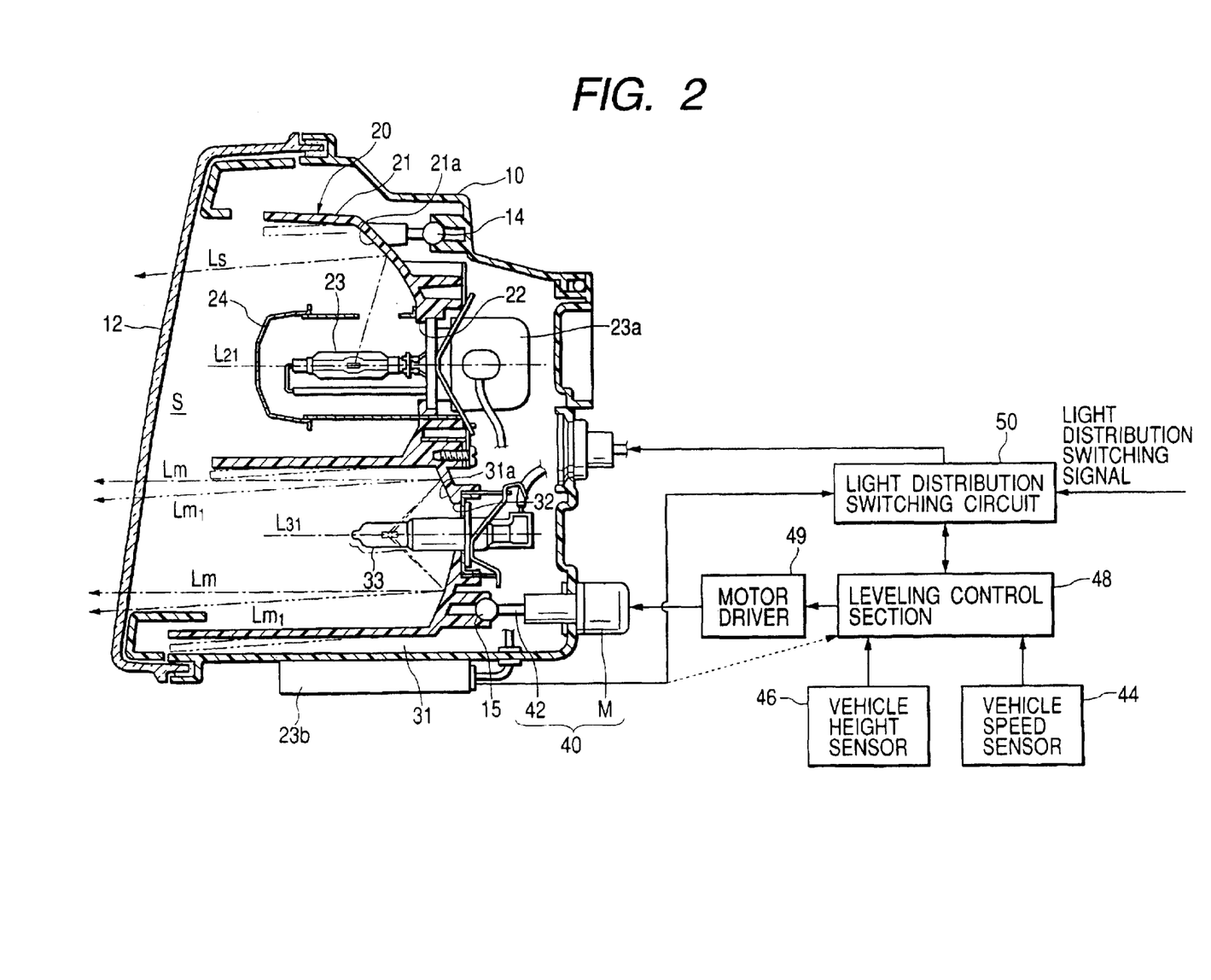
FIG. 2 is a longitudinal sectional view showing the headlamp (a cross-sectional view taken along a line II—II illustrated in FIG. 1)

FIGS. 1 and 2 show a first embodiment of the invention, and FIG. 1 is a front view showing a four-light type headlamp for a vehicle and FIG. 2 is a longitudinal sectional view showing the headlamp (a sectional view taken along a line II—II illustrated in FIG. 1).

In these drawings, the reference numeral 10 denotes a container-shaped lamp body formed of synthetic resin which has a front part opened, and a front lens 12 is assembled into the front opening of the lamp body 10 to form a lamp housing S. Inside of the lamp body 10, that is, in the lamp housing S, a reflector 20 having a reflector 21 for low beam formation and a reflector 31 for main beam formation integrated vertically is tiltably supported around a horizontal tilt axis Lx passing through a pair of left and right ball joints 14 and 14 provided between an upper part on the rear side of the reflector 20 and the lamp body 10. A discharge bulb 23 to be a light source for the low beam is inserted and a shade 24 for light distribution control (clear cut line formation) surrounding the front periphery of the discharge bulb 23 is attached into a bulb insertion hole 22 provided in almost the central part of the upper reflector 21.

For the light emission of the discharge bulb 23, as shown in an arrow Ls of FIG. 2, light is reflected forward and downward by an effective reflecting surface 21a of the reflector 21 with respect to an optical axis L21 and is emitted from the front lens 12 so that a low beam having a predetermined clear cut line which is suitable for illumination at a short distance in the forward part of a vehicle is formed. The reference numeral 23a denotes a lighting circuit housing unit which is integrated with the rear end of the discharge bulb 23. A lighting circuit for starting the discharge of the discharge bulb 23 is accommodated in the unit 23a. Moreover, the reference numeral 23b denotes a ballast circuit unit fixed to the bottom part of the lamp body 10. A ballast circuit is accommodated in the unit 23b in order to cause the discharge bulb 23 to continuously carry out a stable discharge.

On the other hand, a halogen bulb (H1 bulb) 33 to be a light source for a main beam is inserted into a bulb insertion hole 32 provided in almost the central part of the lower reflector 31. For the light emission of the halogen bulb 33, as shown in an arrow Lm of FIG. 2, light is reflected forward in almost parallel with an optical axis L31 by an effective reflecting surface 31a of the reflector 31 and is emitted from the front lens 12 so that a predetermined main beam which is suitable for illumination at a long distance in the forward part of a vehicle is formed.

The low beam and the main beam are formed by turning on the discharge bulb 23 and the halogen bulb 33 through a light distribution switching circuit 50 which receives a light distribution switching signal from a driver.

Moreover, an actuator 40 for auto-leveling to be optical axis tilting means through the lamp body 10 is provided in a lower part on the rear surface side of the reflector 20. The actuator 40 is constituted by a driving motor M and a sliding member 42 for carrying out an advance and retreat operation in connection with the driving operation of the motor M, and the tip of the sliding member 42 and the reflector 20 are connected to each other through a ball joint 15. By the driving operation of the motor M, the sliding member 42 carries out the advance and retreat operation in a longitudinal direction and the reflector 20 can be tilted around the horizontal tilt axis Lx in connection with the advance and retreat operation of the sliding member 42.

An auto-leveling device is mainly constituted by the actuator 40 (the motor M and the sliding member 42) for directly tilting the reflector 20, a vehicle speed sensor 44 for detecting a vehicle speed, a vehicle height sensor 46 constituting a part of pitch angle detecting means of a vehicle, and a control section (CPU) 48 for calculating a vehicle speed and a pitch angle of a vehicle based on a signal sent from the vehicle speed sensor 44 and the vehicle height sensor 46, and for outputting a control signal to a motor driver 49 so that the motor M can be driven in accordance with preset conditions, and the optical axes of the lamp (the optical axes L21 and L31 of the reflector) are tilted and regulated to have always a constant configuration with respect to a driving road, thereby maintaining an excellent visibility in the forward part of the driver.

More specifically, when a load capacity in a vehicle is high, an acceleration is given or a road has a rising gradient, the optical axis of the headlamp is turned upward. Thus, the correlation between the load capacity, the acceleration or the gradient and the optical axis of the headlamp is apparent in advance. Consequently, the auto-leaving device is operated according to the amount of a tilt in the vertical direction of the vehicle based on the load capacity, an acceleration or deceleration state, the gradient of the road and the concavo-convex portions of the road and the reflector 20 is thus tilted around the horizontal tilt axis Lx so that the optical axis of the headlamp can be held to have always a constant configuration with respect to the driving road. The detailed structure of the auto-leveling device has been disclosed in JP-A-2000-85458.

Moreover, the headlamp has a fail-safe function. In the fail-safe function, in the case where the arc of the discharge bulb 23 to be a light source goes out so that proper discharge light emission cannot be obtained when a low beam is turned on, a beam switching circuit (a reserve lighting circuit) 50 is operated to switch a light distribution from the low beam to a main beam, thereby maintaining the illumination of the forward part of a vehicle, and the auto-leveling control section (CPU) 48 drives the actuator 40 (motor M) to turn the optical axis of the lamp downward in order to prevent the main beam from being changed into glare light.

More specifically, in the ballast circuit unit 23b, a power to be supplied to the discharge bulb 23 is regulated to be constant (for example, 35W). In the case such that the power to be supplied is equal to or lower than a predetermined value which causes the arc to go out or the discharge bulb 23 cannot be turned on for some reason, an abnormality is detected from a change in a lamp voltage or a lamp current and the light distribution switching circuit (reserve lighting circuit) 50 to be the light distribution switching means is operated so that the supply of the power is switched from the discharge bulb 23 to be a light source for the low beam into the halogen bulb 33 to be a light source for the main beam.

The light distribution switching circuit (reserve lighting circuit) 50 has an abnormality detecting function of detecting a reduction in the power to be supplied from the ballast circuit unit 23b to the discharge bulb 23. When an abnormality is detected, the supply of the power is switched from the discharge bulb 23 to the halogen bulb 33. The auto-leveling control section (CPU) 48 recognizes that the light distribution switching circuit (reserve lighting circuit) 50 is operated to switch the light distribution, and at the same time, outputs a signal to the motor driver 49 in order to drive the actuator 40 (motor M) by a preset amount. Consequently, the actuator 40 (motor M) is driven (the sliding member 42 is moved backward to a predetermined position) so that the reflector 20 is tilted forward, the optical axis of the lamp (the optical axis L31 of the main beam) is turned forward and downward by a predetermined angle. Thus, it is possible to obtain a downward (main) beam Lm1 which has an excellent visibility at a short distance in the forward part of the vehicle and is not changed into the glare light for a vehicle driving in the opposite direction.

In the embodiment described above, light distribution switching means is constituted by the reserve lighting circuit 50 having the abnormality detecting function. The light distribution switching means may be constituted by a switch for simply switching a power supply path to the discharge bulb 23 and the halogen bulb 33, and a power supply path change-over switch may be operated when the auto-leveling control section (CPU) 48 recognizes a reduction in the power supply from the ballast circuit unit 23b to the bulb 33 as shown in a broken line of FIG. 2.

Figure 3:
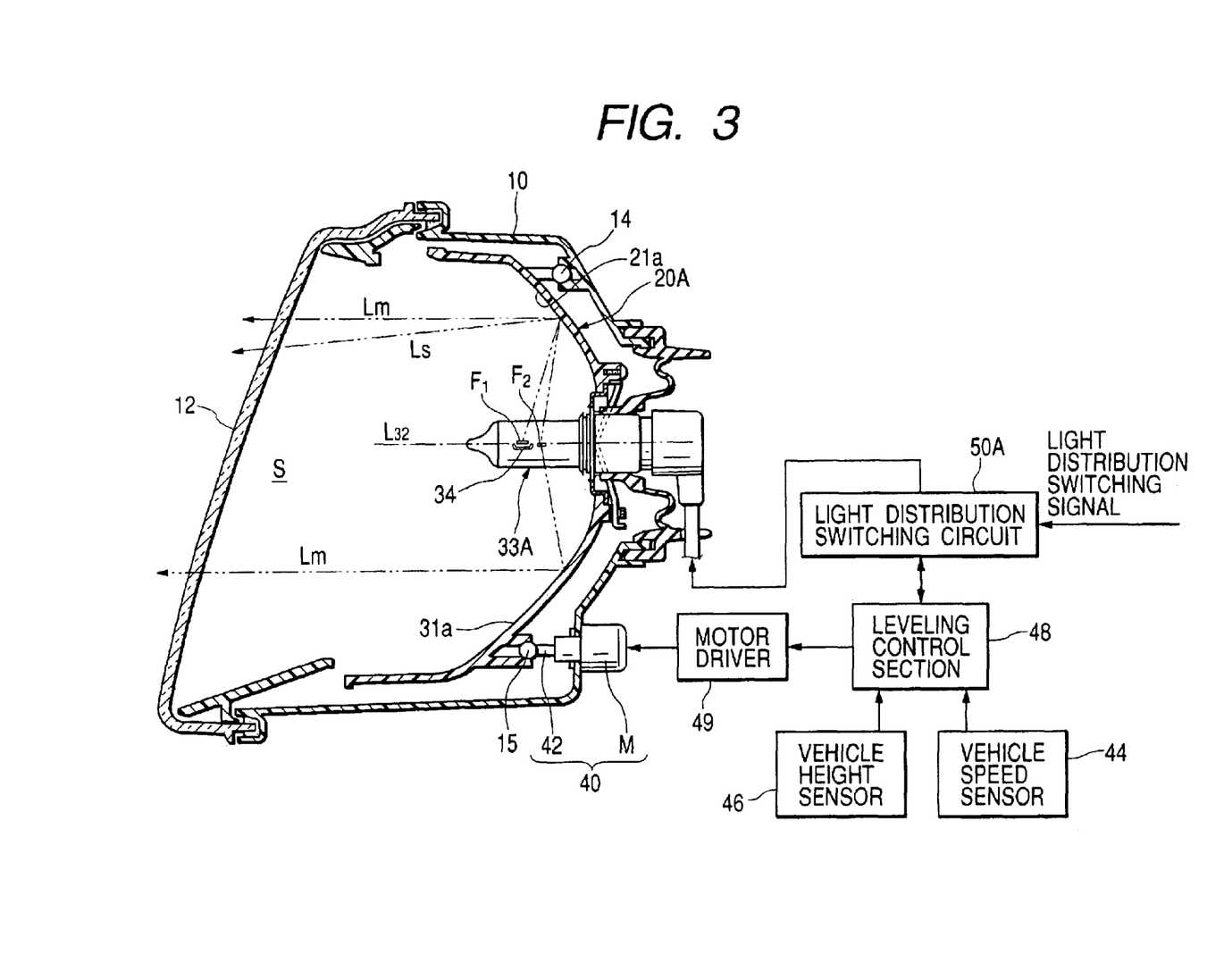
FIG. 3 is a longitudinal sectional view showing a two-light type headlamp for a vehicle according to a second embodiment of the invention.
Figure 4:
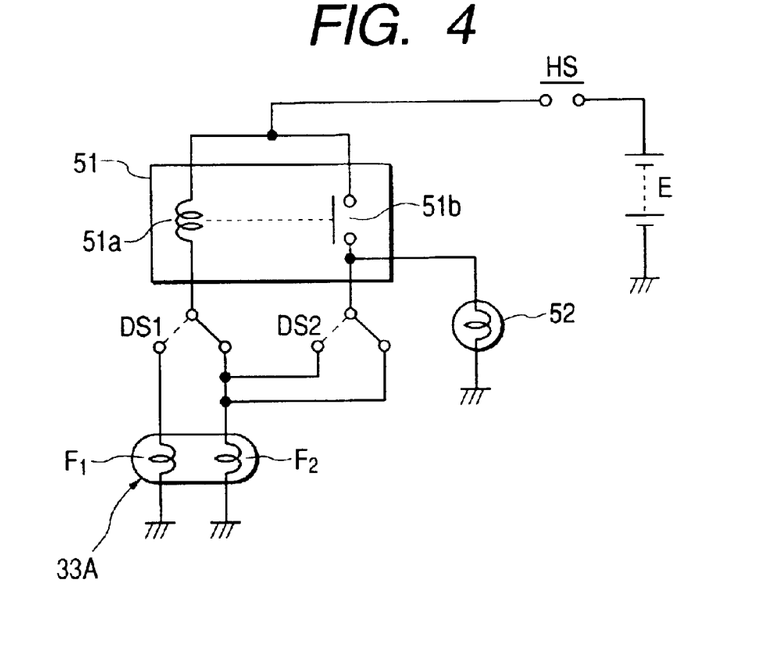
FIG. 4 is a diagram showing the structure of a reserve lighting circuit to be light distribution switching means.

FIGS. 3 and 4 show a second embodiment of the invention (an embodiment corresponding to claim 4), and FIG. 3 is a longitudinal sectional view showing a two-light type headlamp for a vehicle and FIG. 4 is a diagram showing the structure of a reserve lighting circuit to be light distribution switching means.

While the low beam irradiating means constituted by the reflector 21 and the discharge bulb 23 and the main beam irradiating means constituted by the reflector 31 and the halogen bulb 33 are integrated with the reflector 20 in the first embodiment, a halogen bulb (H4 bulb) 33A having a built-in double filament is inserted into a single reflector 20A and the reflector 20A functions as a reflector for a low beam and a reflector for a main beam in the second embodiment.

More specifically, an effective reflecting surface 21a for the low beam is formed in almost the upper half part of the reflector 20A and an effective reflecting surface 31a for the main beam is formed in almost the lower half part of the reflector 20A. Two filaments F1 and F2 are provided apart from each other in an axial direction in the bulb 33A, and a shade 34 for light distribution control is provided under the front filament F1 and light emitted from the filament F1 toward the effective reflecting surface 31a is shielded by the shade 34 for light distribution control (clear cut line formation).

For the light emission of the front filament F1, accordingly, light is reflected forward and downward by the effective reflecting surface 21a for a low beam with respect to an optical axis L32 and is emitted from a front lens 12 as shown in the designation Ls of FIG. 3 so that a predetermined low beam is formed. On the other hand, for the light emission of the rear filament F2, light is reflected by the effective reflecting surface 21a for a low beam and the effective reflecting surface 31a for a main beam in parallel with the optical axis L32 and is emitted from the front lens 12 as shown in the designation Lm of FIG. 3 so that a predetermined main beam is formed.

In the same manner as in the first embodiment, moreover, the reflector 20A is tiltably supported around a horizontal tilt axis Lx (a perpendicular axis to the paper) passing through a pair of left and right ball joints 14 and 14, and furthermore, the optical axis L32 of the lamp (the optical axis of the reflector 20A) can be tilted and regulated by an auto-leveling device.

Moreover, a power supply path to (the filaments F1 and F2 of) the bulb 33A is provided with a reserve lighting circuit 50A to be light distribution switching means including the function of detecting the core breakage of the filament F1. In the case in which the core of the filament F1 for the low beam is broken during the lighting of the low beam, the power supply is switched into the filament F2 for the main beam to turn on the main beam.

When the reserve lighting circuit 50A is operated and the control section (CPU) 48 constituting the auto-leveling device recognizes that the light distribution is switched, moreover, an actuator 40 (motor M) is driven to forward tilt the reflector 20A and to downward turn the optical axis L32 of the lamp (the optical axis of the main beam). Consequently, it is possible to obtain a beam which has an excellent visibility at a short distance in the forward part of a vehicle and can be prevented from being changed into glare light for a vehicle driving in the opposite direction.

FIG. 4 shows the reserve lighting circuit 50A. The reference numeral 51 denotes a unit including an electronic circuit for detecting the core breakage of the filament F1 for the low beam and operating a reserve circuit. When any of the filaments F1 and F2 is disconnected, the disconnection is detected by a coil 51a so that a switch 51b is turned on and a reverse filament to the disconnected filament is turned on. The reference numerals DS1 and DS2 denote first and second dimmer switches interlocking with each other, the reference numeral HS denotes a switch for headlamp lighting, and the reference numeral 52 denotes a warning light to be turned on when the core breakage of the filament F1 for the low beam is detected.

Others are the same as those of the first embodiment and have the same reference numerals, and repetitive description thereof will be omitted.

In the second embodiment, if the core breakage of the low beam is caused, a light distribution is automatically switched from the low beam to the main beam and the optical axis of the main beam is automatically turned downward. A driver recognizing the core breakage of the low beam by the lighting of the warning light 52 may manually switch the light distribution into the main beam or may manually turn the optical axis of the main beam downward.

Figure 5:
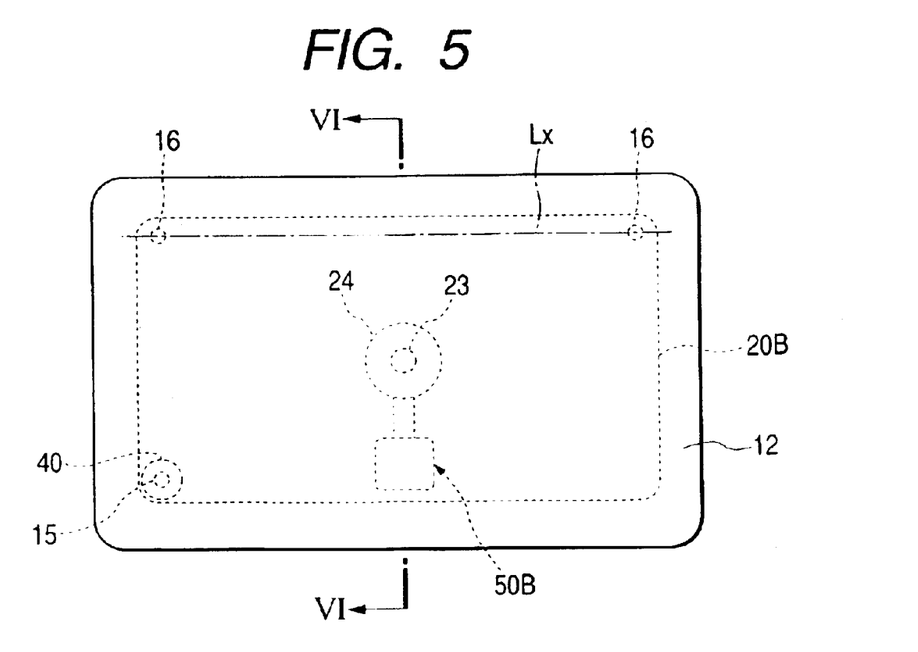
FIG. 5 is a front view showing a two-light type headlamp for a vehicle according to a third embodiment of the invention.
Figure 6:
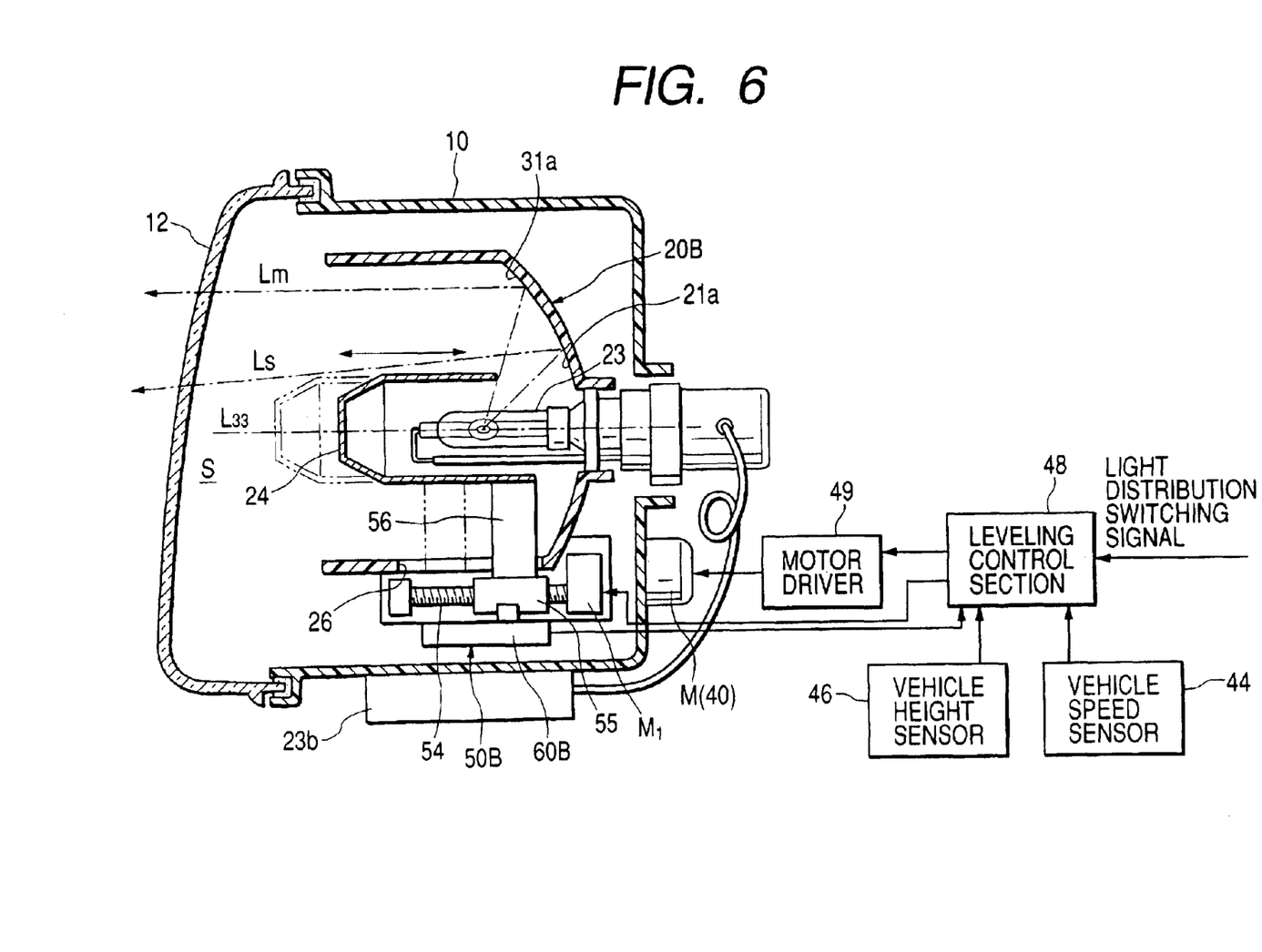
FIG. 6 is a longitudinal sectional view showing the headlamp (a sectional view taken along a line VI—VI illustrated in FIG. 5)

FIGS. 5 and 6 show a third embodiment of the invention (an embodiment corresponding to claim 5), and FIG. 5 is a front view showing a two-light type headlamp for a vehicle according to the third embodiment and FIG. 6 is a longitudinal sectional view showing the headlamp (a sectional view taken along a line VI—VI illustrated in FIG. 5).

While the reflectors 20 and 20A are tiltably supported by the pair of left and right ball joints 14 and 14 in the first and second embodiments, a reflector 20B is fitted into the rear wall of the reflector 20B and is tiltably supported around a horizontal tilt axis Lx passing through a pair of left and light nut members (not shown) screwed into a pair of left and right aiming screws 16 and 16 longitudinally penetrating through a lamp body 10 respectively in the third embodiment.

Moreover, a shade 24 for light distribution formation which covers a discharge bulb 23 is supported by a ball screw slide unit constituting a slide type light distribution switching mechanism 50B to be light distribution switching means which is provided on the lower wall of the reflector 20B. The designation M1 denotes a motor for rotating a ball screw 54, the reference numeral 55 denotes a slider assembled into the ball screw 54 extended longitudinally, and the reference numeral 56 denotes a leg section of the shade 24 which is fixed to the slider 55 through a longitudinal groove 26 formed on the lower wall of the reflector 20B.

Upon receipt of a signal for low beam formation through a control section (CPU) 48, the ball screw slide unit 50B drives the motor M1 and moves the shade 24 along an axis L33 so that the shade 24 is set into a rear position as shown in a solid line of FIG. 6, and a part of the light emission of a discharge bulb 23 is shielded by the shade 24 and is reflected by only a predetermined effective reflecting surface 21a of the reflector 20B, thereby forming a forward and downward low beam Ls.

On the other hand, when the slide unit 50B receives a signal for main beam formation through the control section (CPU) 48, the shade 24 is set into a forward position as shown in a virtual line of FIG. 6 so that light is also guided to an effective reflecting surface 31a other than the effective reflecting surface 21a of the reflector 20B (in general, an effective reflecting surface provided above the effective reflecting surface 21a and at the side thereof) and is reflected. Thus, a main beam LM which is almost parallel with an optical axis L33 is formed, resulting in the light distribution of a main beam obtained by synthesizing both of the beams Ls and Lm.

In the embodiment, there is provided a fail-safe function. In the fail-safe function, in the case where the ball screw slide unit 50B is not operated at all though the ball screw slide unit 50B is made to be driven in order to switch the light distribution from the main beam to the low beam (the case in which the shielding shade 24 is not moved at all), the optical axis of the main beam is turned downward so as not to generate glare light with the light distribution of the main beam maintained (with the shielding shade 24 fixed in that position).

Moreover, in the case where the light distribution cannot be switched though the ball screw slide unit 50B is made to be driven in order to switch the light distribution from the main beam to the low beam (e.g. the shielding shade 24 does not slide to a predetermined rear position, more specifically, the case such that the shielding shade 24 is stopped on the side of the predetermined rear position), the light distribution may be changed over into the original main beam (the shielding shade 24 is returned to a predetermined forward position), and furthermore, the optical axis of the main beam may be turned downward so as not to generate the glare light or the optical axis may be turned downward with the light distribution maintained as it is.

More specifically, a slide type variable resistor 60B for varying a resistance value depending on a position in the axial direction of the slide 55 is provided between the slider 55 of the ball screw slide unit 50B and the reflector 20B, and the resistance value is output to the control section (CPU) 48 constituting an auto-leveling device. Then, the control section (CPU) 48 confirms the correspondence of a signal (a light distribution switching signal) sent from a driving switch (not shown) of the slide unit 50B to the resistance value of a slide resistor 60. In the case in which the resistance value is not changed or an abnormality is caused in the change, an actuator 40 (motor M) is driven to forward tilt the reflector 20 and to downward turn the optical axis of the lamp (the optical axis L33 of the main beam). Consequently, it is possible to obtain a beam which has an excellent visibility at a short distance in the forward part of a vehicle and can be prevented from being changed into glare light for a vehicle driving in the opposite direction.

In that case, moreover, the optical axis is not immediately lowered but the motor M1 may be driven to slide the shade 24 to a main beam forming position and to form a main beam, thereby lowering the optical axis.

In the first and second embodiments, furthermore, the actuator 40 for auto-leveling is provided under the bulb in almost a central part in a transverse direction as seen from the front of the headlamp. In the third embodiment, the actuator 40 for auto-leveling is provided on the left side or the right side as seen from the front of the headlamp in order to avoid an interference with the ball screw slide unit 50B.

Others are the same as those of the first embodiment and have the same reference numerals, and description thereof will be omitted.

Figure 7:
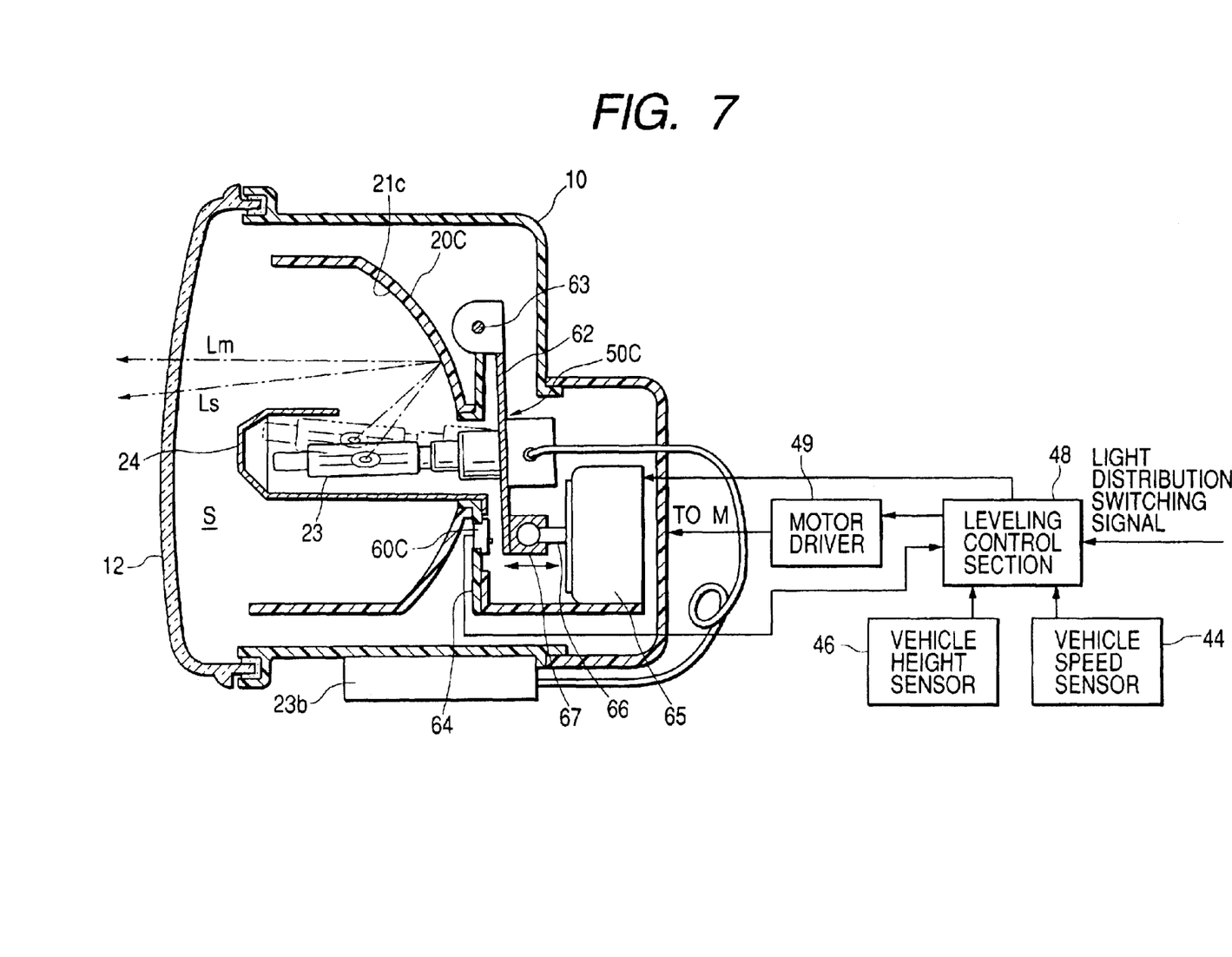
FIG. 7 is a longitudinal sectional view showing a two-light type headlamp for a vehicle according to a fourth embodiment of the invention.

FIG. 7 is a longitudinal sectional view showing a two-light type headlamp for a vehicle according to a fourth embodiment of the invention (an embodiment corresponding to claim 5).

A link type light distribution switching mechanism 50C to be light distribution control means for rocking a discharge bulb 23 with respect to a reflector 20C and a shade 24 for light distribution control and alternatively switching a light distribution for a low beam and a light distribution for a main beam is provided at the back of the reflector 20C.

More specifically, the shade 24 for light distribution control is fixed to the lower part of the peripheral edge of a circular hole in the central part of the reflector 20C and is extended forward to surround the bulb 23. Light which is emitted from the bulb 23 and is not shielded by the shade 24 is guided to an effective reflecting surface 21c of the reflector 20C and is reflected forward so that a predetermined light distribution is formed.

Moreover, the discharge bulb 23 is supported rockably around a horizontal spindle 63 by a rocking link 62, and an electromagnetic solenoid 65 to be an actuator for light distribution switching is mounted and fixed onto a bracket 64 extended to have an L-shape behind and under the reflector 20C, and the lower end of the link 62 is coupled to an advance and retreat rod 66 of the electromagnetic solenoid 65 through a ball joint 67.

The link 62 is rocked by the operation of the electromagnetic solenoid 65 so that the position of the discharge center of the discharge bulb 23 is changed. For this reason, when the link type light distribution switching mechanism 50C receives a signal for main beam formation through a control section 48, the discharge bulb 23 is set into a position shown in a solid line of FIG. 7. Consequently, the light emitted from the discharge bulb 23 is reflected by the effective reflecting surface 21c of the reflector 20C as shown in the designation Lm so that a light distribution for a main beam is formed. Moreover, when the link type light distribution switching mechanism 50C receives a signal for low beam formation through the control section 48, the electromagnetic solenoid 65 is operated so that the link 62 (the discharge bulb 23) is rocked forward (the discharge bulb 23 is set into a position shown in a virtual line of FIG. 7). Consequently, the light emitted from the discharge bulb 23 is reflected forward and downward by the effective reflecting surface 21c of the reflector 20C as shown in the designation Ls so that a light distribution for a low beam is formed.

Moreover, a limit switch 60C is provided between the link 62 and the bracket 64, which detects whether or not the link type light distribution switching mechanism 50C is properly operated (whether or not the discharge bulb 23 is tilted to a proper position for low beam formation). The detection signal of the limit switch 60C is output to the control section (CPU) 48 constituting an auto-leveling device. The control section (CPU) 48 confirms the correspondence of a signal (a light distribution switching signal) sent from a driving switch (not shown) of the link type light distribution switching mechanism 50C to the detection signal of the limit switch 60C. If they do not correspond to each other, the electromagnetic solenoid 65 is driven to rock the link 62 (the bulb 23) to an original main beam forming position, thereby forming a main beam, and furthermore, an actuator 40 (a motor M) is driven to forward tilt the reflector 20C and to turn the optical axis of the lamp (the optical axis of the main beam) downward. Consequently, it is possible to obtain a beam which has an excellent visibility at a short distance in the forward part of a vehicle and can be prevented from being changed into glare light for a vehicle driving in the opposite direction.

Others are the same as those of the first embodiment and have the same reference numerals, and description thereof will be omitted.

Figure 8:
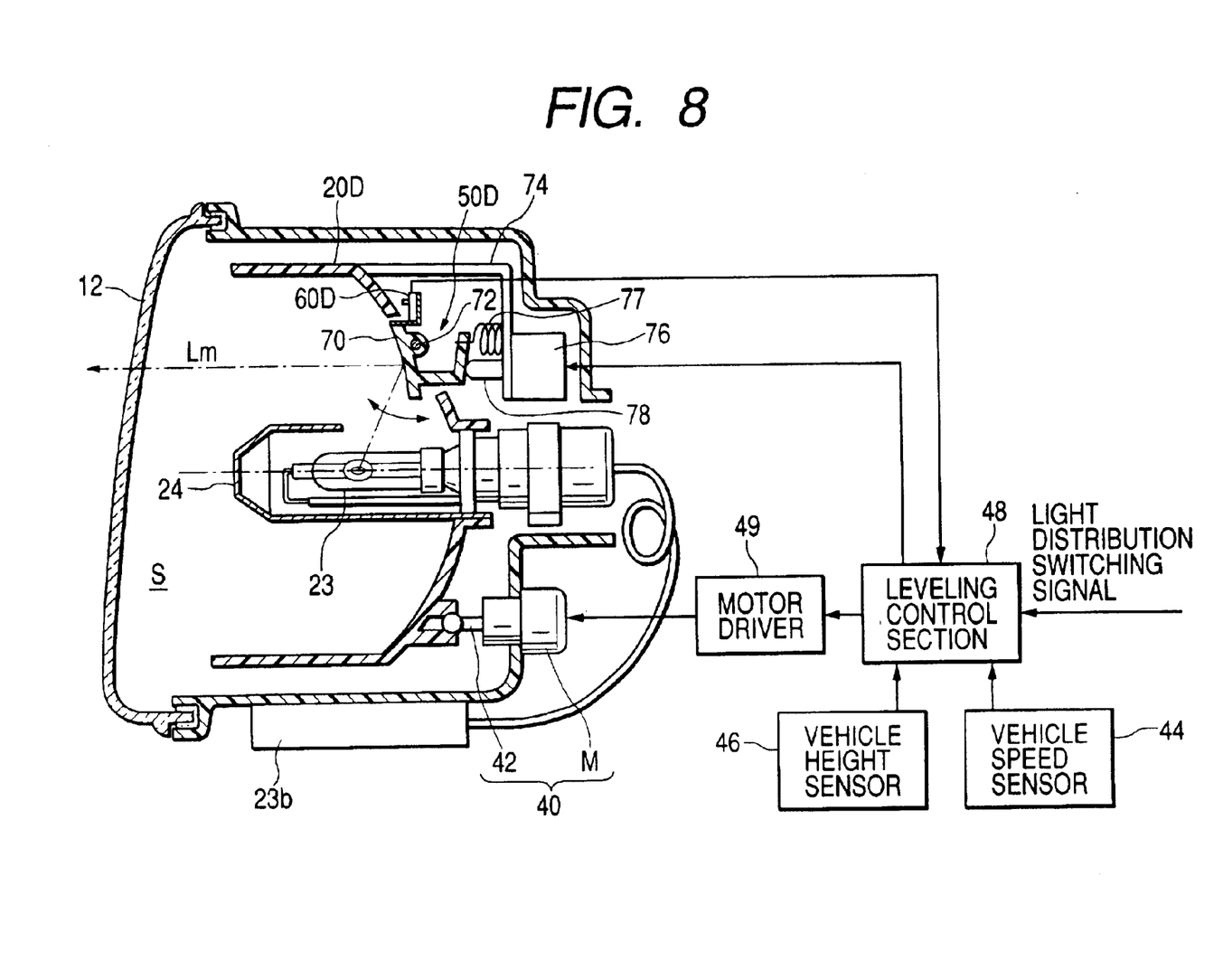
FIG. 8 is a longitudinal sectional view showing a two-light type headlamp for a vehicle according to a fifth embodiment of the invention.

FIG. 8 is a longitudinal sectional view showing a two-light type headlamp for a vehicle according to a fifth embodiment of the invention (an embodiment corresponding to claim 5).

A reflector 20D according to the embodiment is supported tiltably around a horizontal tilt axis passing through a pair of left and right nut members screwed into aiming screws in the same manner as in the reflectors 20B and 20C according to the third and fourth embodiments. By rocking a part of the reflector 20D by means of an electromagnetic solenoid 76, it is possible to alternatively switch a light distribution for a low beam and a light distribution for a main beam.

More specifically, a light distribution switching mechanism 50D to be light distribution switching means for switching the low beam and the main beam according to the embodiment is constituted such that a predetermined upper region of a bulb insertion hole of the reflector 20D can be rocked as a subreflector 70 around a horizontal spindle 72 with respect to the reflector 20D. An electromagnetic solenoid 76 is fixed to a bracket 74 extended toward the back of the reflector 20D, and an advance and retreat rod 78 of the electromagnetic solenoid 76 which is protruded forward can push the subreflector 70, thereby alternatively taking a light distribution forming position for a main beam in which the subreflector 70 is turned upward and a light distribution forming position for a low beam in which the subreflector 70 is provided on the level with the reflector 20D. The reference numeral 77 denotes a return spring of the subreflector 70. The drawing shows a configuration in which a main beam Lm is formed with the light reflected by the upward subreflector 70.

Moreover, a limit switch 60D to be detecting means for detecting whether or not the rocking type light distribution switching mechanism 50D is operated properly (whether or not the subreflector 70 is tilted to a proper position for low beam formation) is provided in the butt portion of the subreflector 70 and the reflector 20D. The detection signal of the limit switch 60D is output to a control section (CPU) 48 constituting an auto-leveling device. The control section (CPU) 48 confirms the correspondence of a signal (a light distribution switching signal) sent from a driving switch (not shown) of the rocking type light distribution switching mechanism 50D to the detection signal of the limit switch 60D. If they do not correspond to each other, the electromagnetic solenoid 76 is driven to rock the subreflector 70 to an original main beam forming position, thereby forming a main beam, and furthermore, an actuator 40 (a motor M) is driven to forward tilt the reflector 20D, thereby downward turning the optical axis of the lamp (the optical axis of the main beam). Consequently, it is possible to obtain a beam which has an excellent visibility at a short distance in the forward part of a vehicle and can be prevented from being changed into glare light for a vehicle driving in the opposite direction.

Others are the same as those of the first embodiment and have the same reference numerals, and description thereof will be omitted.

As is apparent from the above description, according to the headlamp for a vehicle in accordance with the first and second aspects of the invention, in the case in which an abnormality in which a proper low beam cannot be formed is generated, the abnormality detecting means detects the abnormality. Therefore, the light distribution is switched into a main beam manually or automatically if necessary and the optical axis of the main beam is lowered. Consequently, a visibility in the forward part of a driver can be maintained and it is possible to obtain a proper light distribution which can be prevented from being changed into glare light for a vehicle driving in the opposite direction. Therefore, it is possible to vehiclery out the safe driving of a vehicle which cannot be obtained in the conventional art.

According to the second aspect of the invention, in the case in which some abnormality in which a proper low beam cannot be formed is generated, a proper light distribution is automatically formed by a main beam simultaneously with the generation of the abnormality without manually driving the light distribution switching means and the optical axis tilting means purposely. Consequently, the safe driving of a vehicle can be carried out still more.

According to the third aspect of the invention, the structures of the low beam irradiating means, the main beam irradiating means and the light distribution switching means are simplified and a large amount of light can be maintained for each of the beams. Consequently, it is possible to provide a headlamp for a vehicle in which a structure is simplified, a weight is reduced, the light distribution switching means rarely causes a failure, and a visibility is excellent.

According to the fourth aspect of the invention, the size of the headlamp is reduced. Therefore, it is possible to correspondingly increase the degree of freedom of a layout in which the headlamp is provided in a body.

According to the fifth aspect of the invention, the size of the headlamp is reduced. Therefore, it is possible to correspondingly increase the degree of freedom of a layout in which the headlamp is provided in a body. Moreover, the number of lamp components can be reduced because of a single light source.

According to the sixth aspect of the invention, by utilizing the existing auto-leveling device, a countermeasure can be taken against the generation of serious troubles in which a proper low beam cannot be formed. Consequently, it is possible to cope with the abnormality of the low beam without changing the structure of the headlamp.

What is claimed is:

1. A method of maintaining light from a vehicle headlamp having a low beam light source and a main beam light source, comprising:

providing a low beam irradiating means;

providing a main beam irradiating means;

providing a light distribution switching means to switch between energizing the main beam irradiating means and the low beam irradiating means;

detecting abnormality of at least one of the light distribution switching means and the low beam irradiating means;

energizing the main beam irradiating means in response to detecting the abnormality; and tilting the optical axis of at least the main beam irradiating means.

2. The method of claim 1 wherein the optical axis is tilted downward.

* * * * *